United States Patent [19]

Verschoor et al.

[11] Patent Number: 5,632,836

[45] Date of Patent: May 27, 1997

[54] APPARATUS AND METHOD FOR MANUFACTURING A TIRE BEAD CORE ASSEMBLY

[75] Inventors: Adri Verschoor; Rob Franke, both of Losser, Netherlands

[73] Assignee: Robert Franke, Losser, Netherlands

[21] Appl. No.: 235,117

[22] Filed: Apr. 28, 1994

Related U.S. Application Data

[63] Continuation of Ser. No. 30,164, filed as PCT/GB91/02298, Dec. 20, 1991, published as WO92/11131, Jul. 9, 1992.

[30] Foreign Application Priority Data

Dec. 21, 1990 [NL] Netherlands ............................ 9002848
Dec. 20, 1991 [WO] WIPO ...................... PCT/GB91/02298

[51] Int. Cl.$^6$ ...................................................... B29D 30/48
[52] U.S. Cl. ........................... 156/111; 156/136; 156/396; 156/422; 245/1.5
[58] Field of Search ............................... 156/136, 396, 156/422, 460, 130.7, 111, 398, 135, 217; 245/1.5; 140/88

[56] References Cited

U.S. PATENT DOCUMENTS

| | | |
|---|---|---|
| 1,727,090 | 9/1929 | Alderfer . |
| 1,759,669 | 5/1930 | Stevens .............................. 156/422 |
| 1,871,119 | 8/1932 | Denmire . |
| 1,944,768 | 1/1934 | Stevens .............................. 156/136 |
| 2,902,083 | 9/1959 | White .............................. 156/136 |
| 2,979,109 | 4/1961 | Dieckmann .............................. 156/422 |
| 3,051,221 | 8/1962 | Strozewski .............................. 156/422 |
| 3,962,020 | 6/1976 | Yonekawa et al. . |
| 4,354,892 | 10/1982 | Tarantola et al. .............................. 156/398 |
| 4,410,389 | 10/1983 | Cole et al. .............................. 156/398 |
| 4,759,813 | 7/1988 | Banas et al. . |
| 4,933,034 | 6/1990 | Kokubu et al. .............................. 156/136 |
| 5,100,497 | 3/1992 | Moody et al. .............................. 156/460 |
| 5,108,538 | 4/1992 | Kokubu et al. .............................. 156/460 |
| 5,114,512 | 5/1992 | Holroyd et al. .............................. 156/135 |

FOREIGN PATENT DOCUMENTS

| | | |
|---|---|---|
| 2360748 | 6/1975 | Germany . |
| A2803460 | 1/1978 | Germany . |
| A3108142 | 3/1981 | Germany . |
| 3247441 | 6/1984 | Germany . |

*Primary Examiner*—Geoffrey L. Knable
*Attorney, Agent, or Firm*—Howson and Howson

[57] ABSTRACT

An apparatus for manufacturing an assembly of an annular bead wire core and a surrounding ring of filler material attached thereto comprising at least one former, typically mounted on a turntable, and a number of stations. At a first station, rubber-coated bead wire is wound around the former to produce the annular bead wire core. At a second station, the ring of filler material is arranged over the previously wound rubber-coated wire core to form the bead core assembly and at a third station the bead core assembly is unloaded from the former. Conveniently the former(s) is(are) moved from station to station by indexing movement of the turntable.

The invention also relates to a method of manufacturing a tire bead core assembly.

16 Claims, 6 Drawing Sheets

5,632,836

APPARATUS AND METHOD FOR MANUFACTURING A TIRE BEAD CORE ASSEMBLY

This is a continuation of application Ser. No. 08/030,164, filed as PCT/GB91/02298, Dec. 20, 1991, published as WO92/11131, Jul. 9, 1992.

TECHNICAL FIELD

This invention relates to an apparatus for, and a method of, manufacturing an assembly of an annular bead wire core and a surrounding ring of filler material. Such tire bead core assemblies are used in the manufacture of vehicle tires, e.g. pneumatic tires for cars and light trucks. In this specification the term "bead wire" is intended to encompass any suitable high tensile filamentary material, e.g. steel wire, which may comprise a single rubber-coated strand or several rubber-coated strands arranged in a tape.

BACKGROUND ART

The tire bead core of a pneumatic tire is substantially inextensible and ensures that the tire is retained on a wheel rim. Typically a tire bead core is produced by winding bead wire, e.g. steel wire, in several layers around a former. When the filamentary material comprises several strands which have previously been brought together and passed through a rubber-coating device to form a "tape" of filamentary material, such "tapes" of filamentary material are wound helically a number of convolutions on to a former to form an annular bead wire core of a desired strength. Prior to wrapping tire ply material around the bead wire core, a ring of elastomeric filler material is wrapped around the annular bead wire core to produce a tire bead core assembly.

The manufacture of the annular bead wire core and the fitting of the ring of filler material onto the bead wire core are presently carried out as separate operations resulting in considerable time being taken and extra labour being required.

The present invention aims to provide apparatus and a method for the manufacture of an assembly of an annular bead wire core and ring of filler material as a semi-finished component for use in the tire industry. It is also an aim of the present invention to ensure that, in the semi-finished component, the wound bead wire, i.e. the wound rubber-coated strand or strands which form the tire bead core, are correctly positioned from the inner to the outer convolutions since, if the strands are placed incorrectly, there is a risk that the semi-finished component could not be further processed on tire making machines and that air would become trapped within the tire bead core assembly with disastrous consequences in the characteristics of the finished shaped tire. A further aim of the invention is to ensure that the ring of filler material is virtually seamless lying in one whole piece circumferentially against the wound rubber-clad strands around the circumference.

DISCLOSURE OF THE INVENTION

These aims are accomplished in accordance with the invention as defined in the appended claims 1 and 15.

Preferably the former is mounted on movable mounting means, the latter being indexable to move the former from a bead wire winding first station to a filler material applying second station and from the second station to a bead assembly unloading third station. Preferably the movable mounting means comprises a turntable.

Typically at least one, and preferably three or four, formers are mounted on the movable mounting means so that different formers are positioned in different stations at each indexed position of the mounting means.

Preferably for the or each former, the or each gripping unit comprises a striker and a movable locking mechanism for clamping the leading end of the bead wire material therebetween so that optimum wrapping or winding of the bead wire material is achieved. Furthermore, it is preferred that the striker is movable, in a direction substantially parallel to the former axis, into and out of a gripping position. This requires care to be taken to ensure that the inner free end of the wound bead wire material is pushed against the inside of the formed bead, thereby obtaining a mainly circular internal area.

Preferably the former segment fitted with the gripping unit is stationary relative to the other segments during the manufacturing procedure, but at other times the segment may be adjustable. In this way an increased dependability for retaining the bead wire material is obtained.

The alignment of the trailing end of the bead wire material is further assured if the first station is equipped with a pressing device to press the bead wire material against the former as it is wound.

A secure retention of the ring of filler material on the formed bead wire core and a seamless transition between the ends of the ring of filler material is obtained by equipping the second unit with pushing means to push the filler material ring onto the annular bead wire core.

The production speed of the apparatus in accordance with the invention can be increased further if, preferably, the or each former includes at least two axially spaced apart annular winding surfaces. It is preferable that winding surfaces define a common cylindrical surface. In this way at least two tire bead core assemblies can be formed on a former at the same time. Preferably the second station comprises two sub-stations in each of which a ring of filler material is fitted on a different one of the two winding surfaces of a former. In this way the production speed is further increased, in spite of the often relatively large size of the second unit.

An optimum production speed is obtained if, preferably, the bead wire material is supplied in the form of a layer of a number of rubber-coated parallel bead wires or filaments. Then the bead wire core can be formed in a minimum winding time.

It is preferable that the number of bead filaments or strands in the layer is from 2 to 7.

BRIEF DESCRIPTION OF THE DRAWINGS

Embodiments of the invention will now be described, by way of example with reference to the accompanying drawings, in which.

BEST MODES FOR CARRYING OUT THE INVENTION

Figure 1:
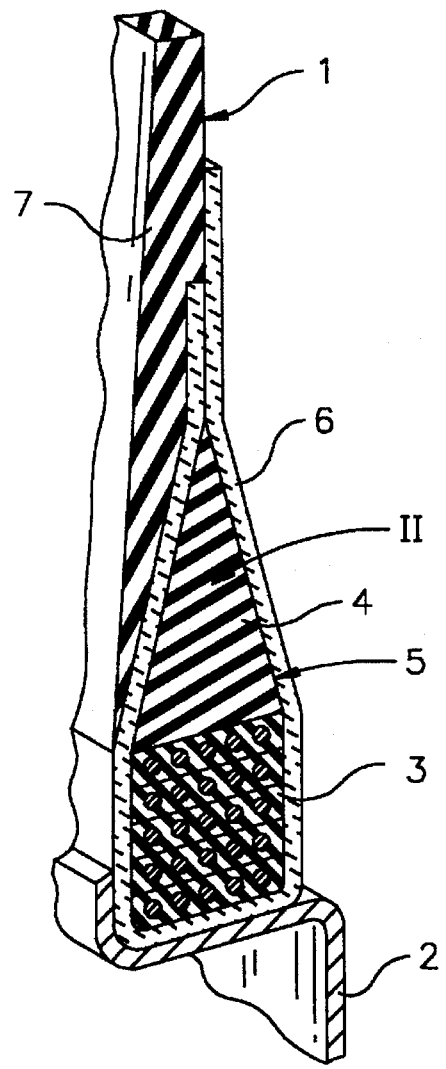
FIG. 1 is a part sectional view of a tire fitted on a wheel rim.

FIG. 1 shows part of a tire 1 fitted to a wheel rim 2. The tire 1 comprises an annular tire bead core 3 having a ring 4 of elastomeric filler material adhered thereto to form a tire bead core assembly 5. A rayon cloth 6 is wrapped around the assembly 5 and the entire assembly is joined to a side wall 7 of the tire.

Figure 2:
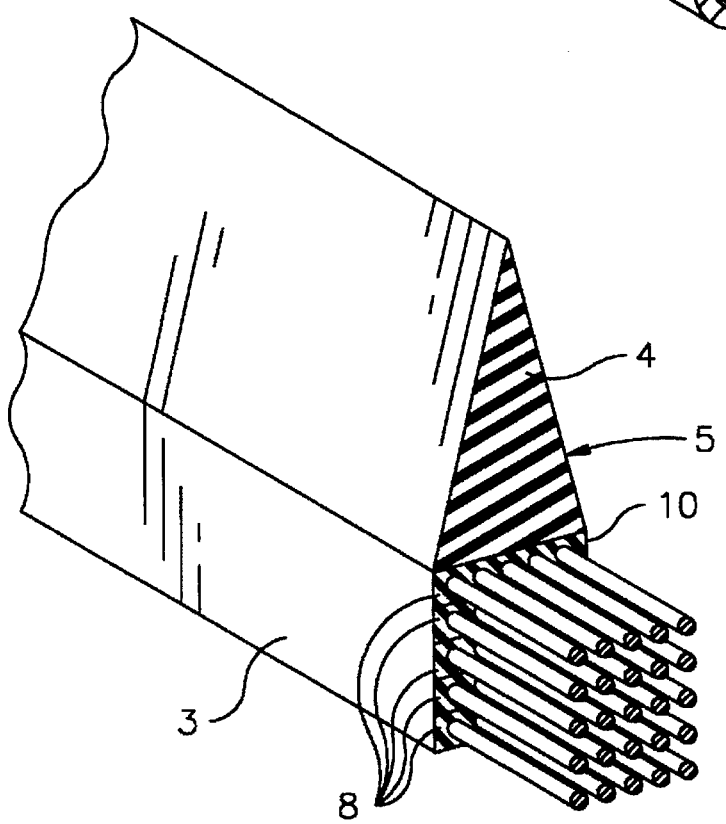
FIG. 2 is a detail of FIG. 1 showing a tire bead core assembly.

FIG. 2 shows the tire bead core assembly 5 in more detail. The bead core 3 comprises of five wrapped layers 8, each layer 8 consisting of five parallel strands of high tensile filamentary material, preferably steel wires, which are clad or coated with rubber 10. For the rubber 10 and the rubber of filler ring 4, conventional rubber tire materials may be used which show a relatively good adhesion during processing in heated conditions.

Figure 3:
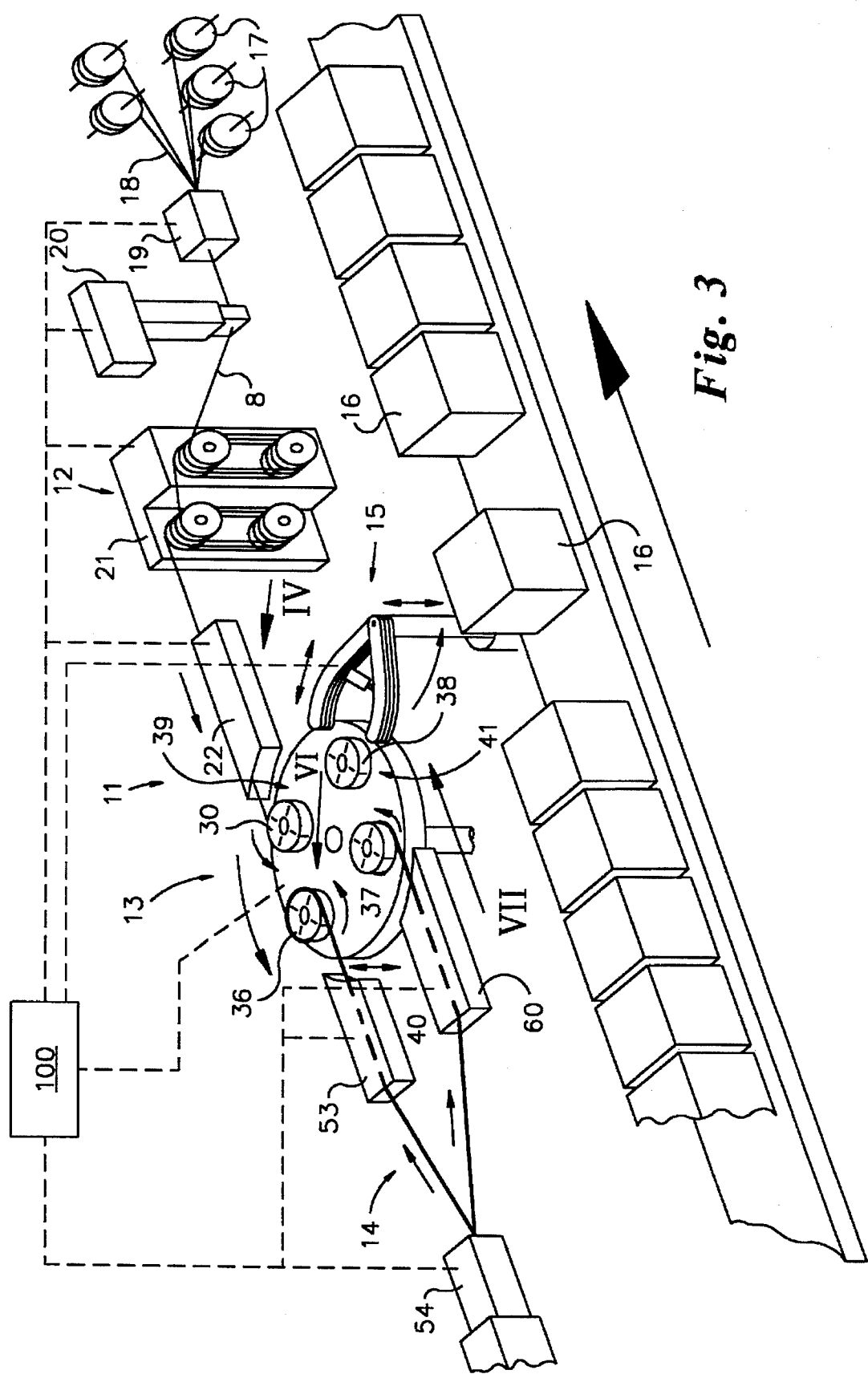
FIGS. 3 and 8 are schematic representations of apparatus according to the invention for forming tire bead core assemblies.

FIG. 3 shows an apparatus or installation according to the invention, for the manufacture of the bead core assembly 5 shown in FIG. 2. The installation comprises a bead wire supply unit 12, a turntable 13, a supply unit 14 for the filler material and an unloading unit 15 for placing completed bead core assemblies 5 into cassettes 16.

The supply unit 12 comprises reels 17 of steel wire 18, a unit 19 for the parallel orientation of the steel wires which are then coated with rubber 10 by passage through a rubber extruder 20. On leaving the extruder the wires 18 are formed into a filamentary, rubber-coated tape or layer 8. As the layer 8 leaves the extruder 20, it passes into an accumulator 21 where the layer is held for subsequent supply at variable transport speed, e.g. discontinuously, to the turntable 13 by means of a transporter 22.

Figure 4:
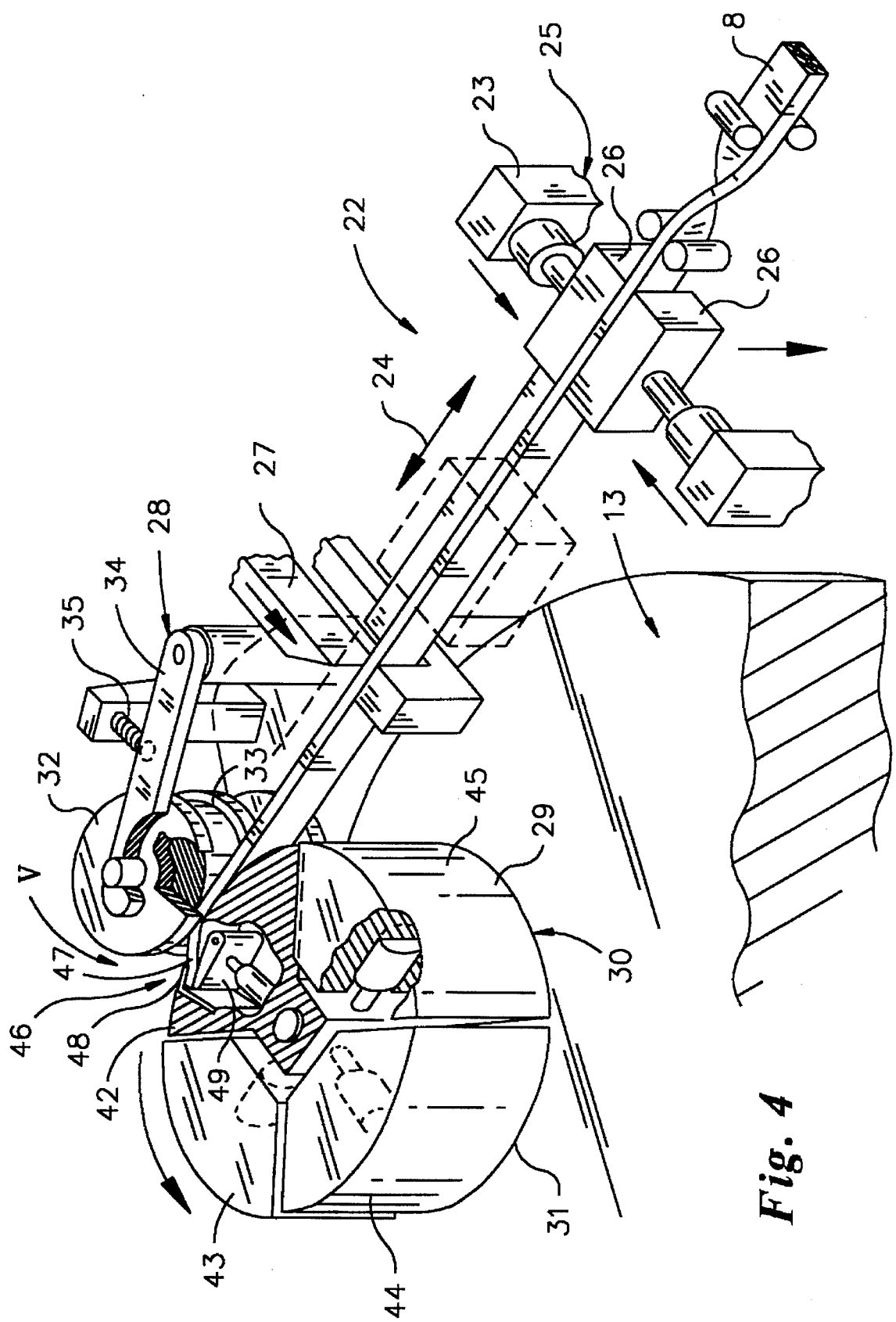
FIG. 4 is a view, on an enlarged scale, of detail IV of FIG. 3.

The transporter 22 is shown in more detail in FIG. 4 and comprises, as indicated by double arrow 24, a reciprocating gripping unit 23 for gripping the layer 8 between blocks 26. The gripping layer 8 is supplied, speeded up, to the turntable 13 and after the supply of a measured length, is cut to the desired length by a knife 27. With the aid of pressing means 28, the layer 8 is pushed against the surface 29 of a former 30. The pressing means 28 comprises a pressure roller 32, which, initiated by means of a lever 34 urged by a spring 35, is pressed against the former 30. The pressure roller 32 has an annular groove or recess 33 whose depth is slightly less than the thickness of each layer 8 of the formed annular bead core 3.

The turntable 13 carries four independently rotatable formers 30, 36–38 which are equally spaced radially from the axis of rotation of the turntable and equally spaced circumferentially relative to each other. In FIG. 3 the former 30 is positioned in a bead winding first station 39, the formers 36 and 37 are positioned in a filler material applying second station 40 and the former 38 is positioned in a discharge or unloading third station 41.

As shown in FIG. 4, the former 30 comprises a segmented formwheel 31 having a fixed formwheel segment 42, and three radially reciprocating movable formwheel segments 43–45. In FIG. 4 worms are shown positioned beneath the formwheel segments 43–45 and engage with teeth on the bottom surfaces of the segments 43–45 to move the segments radially inwards or outwards. The fixed formwheel segment 42 is adapted to carry grip attachments 46 for the seizing or gripping of the leading end 47 of the layer 8. The grip attachments 46 comprises an angle shaped striker 48 situated in the former 29, and a locking device 49, for trapping the layer 8 against the striker 48.

Figure 5:
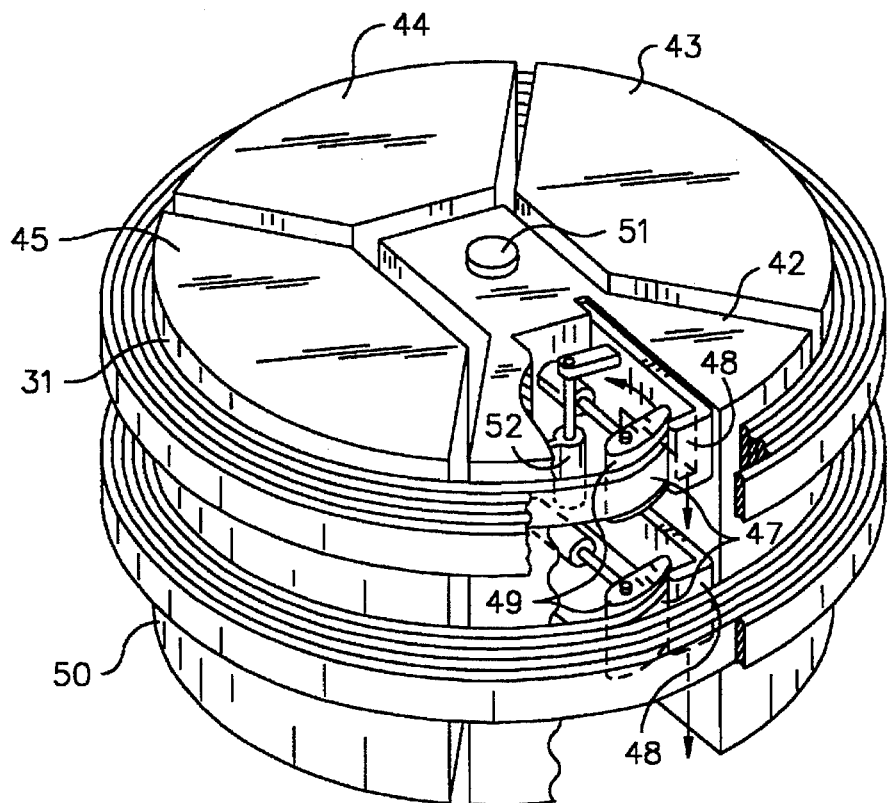
FIG. 5 is a view, on an enlarged scale, of detail V of FIG. 4.

As shown in more detail in FIG. 5 the former 30 comprises two coupled former rings 31 and 50, defining axially spaced apart annular winding surfaces, which are mounted on a common rotatable former shaft 51. It should be understood that in FIG. 3 and 4 only the winding of the bead on former ring 31 has been shown but that in fact winding takes place on the upper former ring 31 and the lower former ring 50 simultaneously. Of course it is also possible to provide more than two former rings to enable more than two bead core assemblies to be simultaneously formed.

Figure 6:
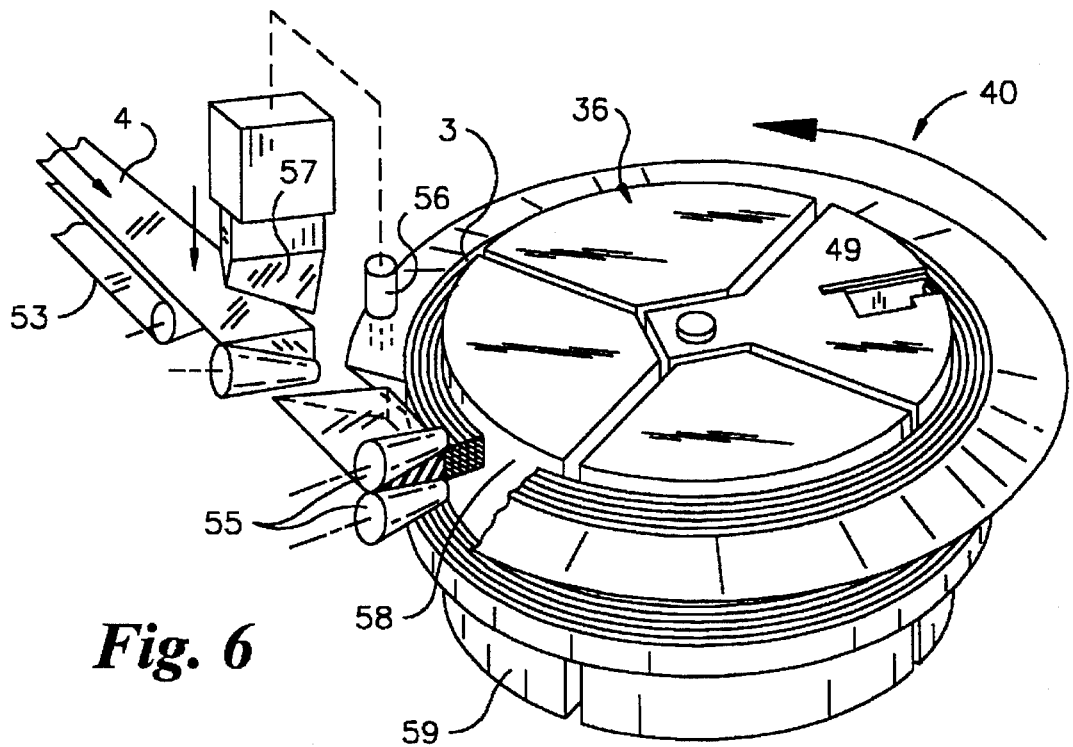
FIG. 6 is a view, on an enlarged scale, of detail VI of FIG. 3.

FIG. 6 shows in more detail the former 36 in the second station 40. In this station, elastomeric filler material 4, produced to the desired, e.g. triangular, cross-section by an extruder 54, is fed by means of a conveyor 53 and a pair of frusto-conical rollers 55, which press the material 4 against the wound bead 3. With the aid of a detector 56 the required length of the filler ring-forming material is defined and is cut with a knife 57. The length of filler material is directed and placed on the upper former ring 58 of the former 36. The length is such that the filler ring produced is seamlessly fitted in the circumferential direction on top of the previously wound rubber-coated steel wire. In the same way a length of filler material is supplied by the conveyor 60 and placed on the lower former ring 59 of the former.

Figure 7:
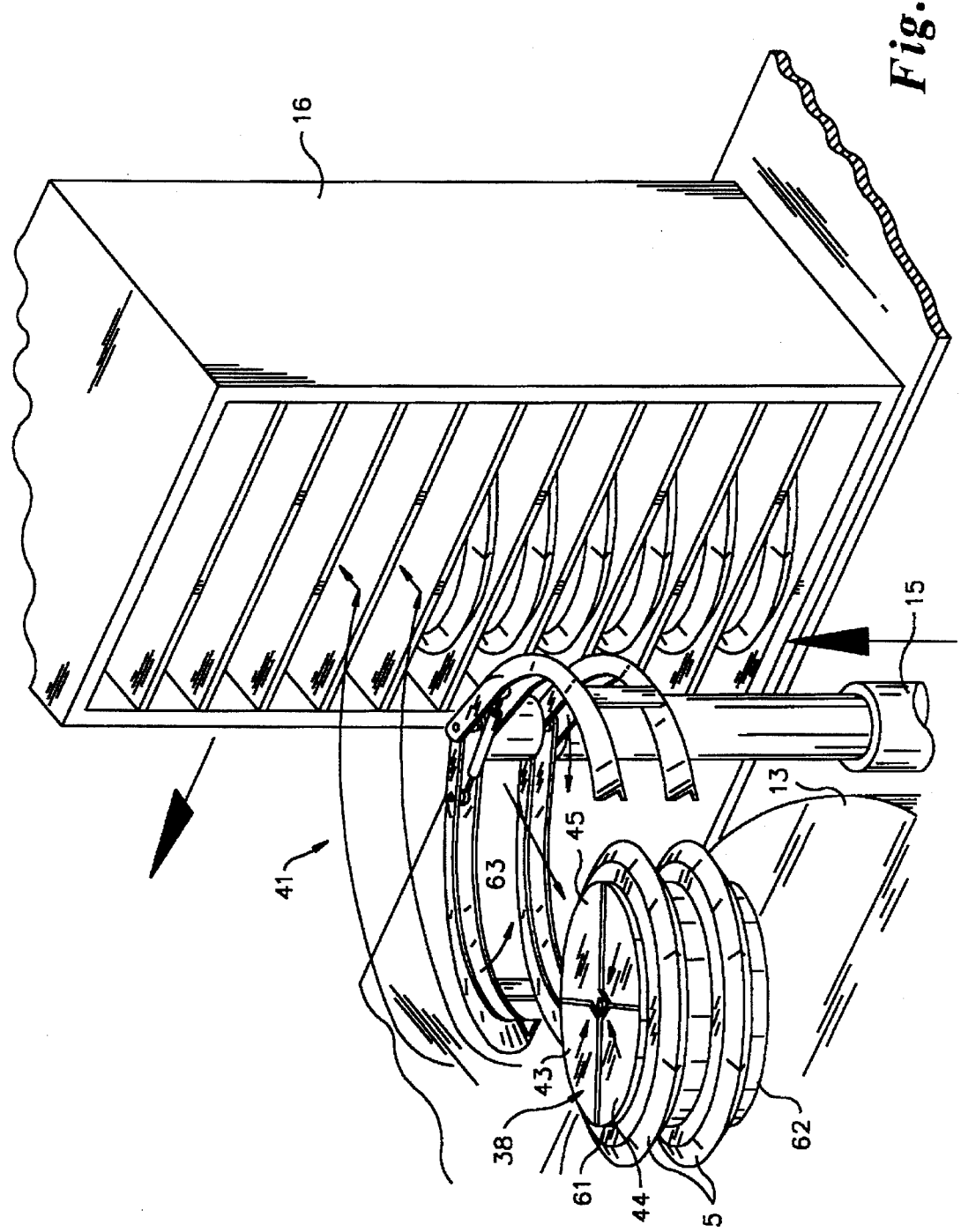
FIG. 7 is a view, on an enlarged scale, of detail VII of FIG. 3.

FIG. 7 shows the unloading third station 41 with a discharge unit 15. The former 38 is fitted with two former rings 61 and 62 from which two bead assemblies 5 are removed by unloading devices 63. After the unloading device 63 have seized the two bead assemblies 5 the former segments are moved radially inwards, as indicated by the arrows, and the unloading devices 63 place the two bead assemblies in the cassette 16.

From the description it will be clear that by indexing the turntable 13 through 90° indexing turns, the four formers are successively moved between the various stations and in doing so bead assemblies 5 are produced at a high production rate and are unloaded into the cassette 16. Since the second station comprises two sub-stations, the four formers are each located in a different station or sub-station after each indexing rotation or turn of the turntable 13. Reference number 100 indicates schematically a control arrangement for controlling the sequencing of the various operations involved in producing a tire bead core assembly on the apparatus.

Figure 8:
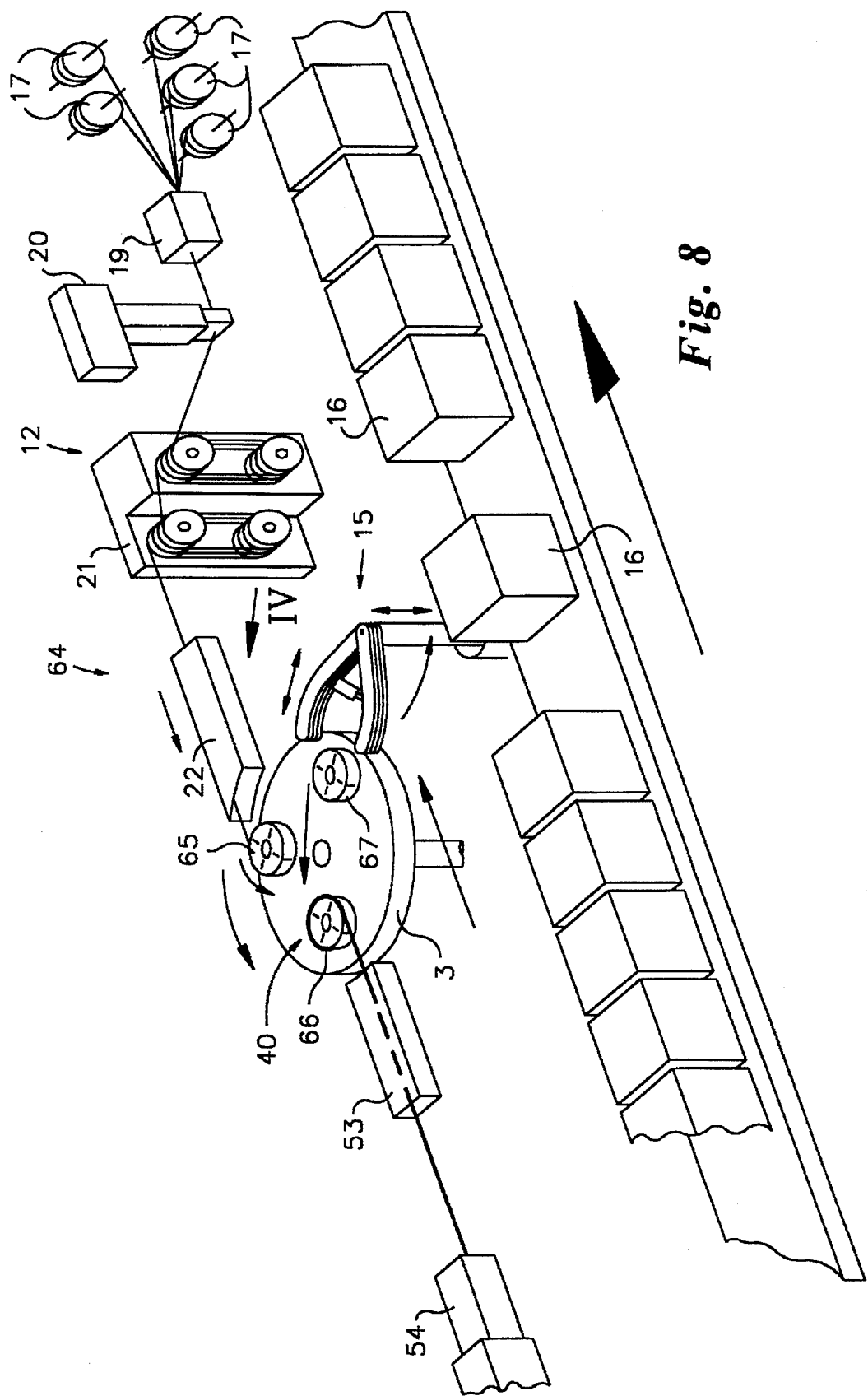

FIG. 8 shows alternative apparatus 64, according to the invention, with a turntable 3 mounting only three formers 65, 66 and 67, each equipped with only one former ring. The difference over apparatus 11 is that in the second station 40 only one former is present, carrying one bead 3 for the application thereto of a ring 4 of filler material. The production speed is lower, but identical assemblies 5 are formed.

Although the apparatus described includes a turntable 3 which moves a former from one station into the next station, it is of course possible to move the formers into "dwell" locations between each station. For example the turntable 3 in FIG. 8 could in principle mount six formers angularly spaced 60° apart and with the stations spaced 120° apart. Two indexing rotations would then be required to move a former from one to the next succeeding station. Although less preferred, because it does not produce bead assemblies at such high rates, it will be realised that only one former need be mounted on the turntable. In this case the various operations could not be performed simultaneously at each station as is possible when three or more formers are mounted on the turntable.

Although the formers have been described herein as being mounted on a rotatable turntable, it will be appreciated that the formers could instead be mounted on a different type of movable mounting means which is movable to move the formers successively into different stations. For example the formers could be mounted on linearly movable mounting means with the various stations arranged in a line. However this is less preferred to the arrangement of a turntable which on indexing rotation will automatically return a former to the first station after leaving the third station. Furthermore, it would be possible to form a bead wire core assembly on a single former with the various stations arranged around it. However this arrangement is a less preferred design since production speed is slow as only one bead core assembly is produced at a time.

We claim:

1. A method of manufacturing a tire bead core assembly of a bead wire material and a surrounding ring of a filler material having tapered sides extending radially outward from a base, comprising:

coating wire material with rubber at a coating station to form a rubber-coated bead wire material;

feeding the rubber-coated bead wire material in a continuous length from the coating station to a rotatable former;

rotating the former to wind at least one layer of the rubber-coated bead wire material fed thereto onto an annular winding surface of the former to form a bead wire core;

extruding a length of elastomeric filler material to a desired cross-section and supplying it to the former;

without removing the at least one layer of rubber-coated bead wire material from said annular surface of the former, rotating the former to wind the filler material in a single turn directly onto the wound bead wire core and causing the base to be simultaneously pressed against, and securely retained on, the underlying bead wire core to form a bead core assembly consisting of the wound bead wire core and the filler material, wherein the filler material and the bead wire core are held together entirely by the direct adhesion of the filler material to the bead wire core; and unloading the formed bead core assembly from the former prior to the formation, on a tire building drum, of a tire incorporating said formed bead core assembly.

2. A method according to claim 1, in which the rubber-coated bead wire material is wound on to the annular winding surface of the former at a first station, the length of filler material is nipped and wound in a ring around the rubber-coated bead wire core at a second station, and the formed bead core assembly is removed from the former at a third station, the former being moved sequentially from the first station to the second station and from the second station to the third station.

3. A method according to claim 2, in which the former is mounted on a rotatable turntable at a distance from the axis of rotation of the latter and the turntable is rotatably indexed to move the former from station to station.

4. A method according to claim 3, in which at least three formers are mounted on the turntable, whereby, in each indexed position, one former is positioned at the first station, one is positioned at the third station and at least one former is positioned at the second station.

5. Apparatus for manufacturing a tire bead core assembly, the assembly consisting of a rubber-coated bead wire material and a surrounding ring of elastomeric filler material having tapered sides extending radially outward from an inner base, the apparatus comprising:

mounting means movable between at least first, second and third stations;

coating means for coating wire material with rubber to form a rubber-coated bead wire material;

a former rotatably supported on said mounting means having an annular winding surface and a bead wire material gripping device;

rotating means for rotating the former;

means for feeding said rubber-coated bead wire material in a continuous length from said coating means to said first station;

first means located at said first station including a feeding unit arranged to feed the leading end of the rubber-coated bead wire material to the gripping device so that, when said leading end is gripped by the gripping device and the rotating means are subsequently operated to rotate the former, at least one layer of the rubber-coated bead wire material is wound onto the annular winding surface, and a pressing unit arranged to press the bead wire material against the winding surface to form an annular bead wire core on the former;

second means located at said second station including means for receiving the filler material, aligning the filler material with the core so that the filler material is wound directly onto the core, while the core remains on the former, as the former is rotated and pressing the base of the filler material onto the annular bead wire core as the former is rotated to wind the filler material onto the core and simultaneously securely retain the filler material on the formed annular bead wire core to form a tire bead core assembly; and third means located at said third station for unloading the tire bead core assembly from the former.

6. Apparatus according to claim 5, in which the apparatus further comprises indexing means for moving the former sequentially into said first, second and third stations.

7. Apparatus according to claim 6, in which the mounting means comprises a turntable rotatable about a first axis, the first, second and third stations being arranged around the turntable and the former being radially spaced from said first axis.

8. Apparatus according to claim 6, in which more than one rotatable former is mounted on the mounting means, the formers being positioned so that in any indexing position at least two formers are positioned respectively in at least two of said stations.

9. An apparatus according to claim 8, in which each former includes at least two axially spaced apart annular winding surfaces on which the rubber-coated bead wire material is to be wound and a rotatable former shaft for rotating the winding surfaces together.

10. An apparatus according to claim 9, in which the second station comprises two sub stations in each of which said filler material is applied to at least one of said annular winding surfaces.

11. Apparatus according to claim 8, in which each said former has a gripping device and in which each said gripping device comprises a striker and a movable locking member for clamping the leading end of the rubber-coated bead wire material between the striker and the locking member.

12. An apparatus according to claim 11, in which the striker is movable in a direction parallel to the rotational axis of the former into and out of a gripping position.

13. Apparatus according to claim 8, in which the mounting means comprises a turntable rotatable about a first axis, the first, second and third stations being arranged around the turntable and each said former being radially spaced from said first axis.

14. An apparatus according to claim 5, including means for arranging the rubber-coated bead wire material fed to the first means in the form of a layer comprising a number of parallel wire strands.

15. An apparatus according to claim 14, in which the number of wire strands in said layer is from 2 to 7.

16. An apparatus according to claim 5, in which the former comprises a number of angularly spaced apart former segments one of which is at least substantially fixed and mounts said gripping device.

* * * * *